United States Patent [19]
Dang et al.

[11] Patent Number: 5,423,018
[45] Date of Patent: Jun. 6, 1995

[54] QUEUE TIME REDUCTION IN A DATA-STORAGE HIERARCHY USING VOLUME MOUNT RATE

[75] Inventors: Chi H. Dang; Michael T. Solan; Daniel J. Winarski, all of Tucson, Ariz.

[73] Assignee: International Business Machines Corporation, Armonk, N.Y.

[21] Appl. No.: 976,815

[22] Filed: Nov. 16, 1992

[51] Int. Cl.⁶ .............................................. G06F 12/08
[52] U.S. Cl. ................................. 395/425; 395/600; 395/250; 364/282.2; 364/245.2; 364/243.2; 364/DIG. 1
[58] Field of Search ................. 395/425, 250, 600; 364/478

[56] References Cited

U.S. PATENT DOCUMENTS

| | | | |
|---|---|---|---|
| 4,542,458 | 9/1985 | Kitajima et al. | 364/200 |
| 4,603,382 | 7/1986 | Cole et al. | 395/250 |
| 4,703,422 | 10/1987 | Kinoshita et al. | 395/425 |
| 4,864,511 | 9/1989 | Moy et al. | 364/478 |
| 4,876,662 | 10/1989 | Pence | 364/403 |
| 4,945,428 | 7/1990 | Waldo et al. | 360/92 |
| 5,131,087 | 7/1992 | Warr | 395/425 |
| 5,197,055 | 3/1993 | Hartung et al. | 395/425 |
| 5,287,459 | 2/1994 | Gniewek | 395/275 |

Primary Examiner—Thomas G. Black
Assistant Examiner—Larry J. Ellcessor
Attorney, Agent, or Firm—M. W. Schecter

[57] ABSTRACT

The utilization of a level of a data storage hierarchy is monitored and the data in such level is manipulated in response thereto. In a data storage hierarchy including an automated storage library, the utilization is a mount rate relative to the maximum possible mount rate. When the combined utilization of all of the libraries exceeds a predetermined value, data is promoted from the most utilized library (or libraries) to a higher level in the data storage hierarchy until the combined utilization of all of the libraries is sufficiently reduced. By reducing the combined utilization of all of the libraries, the average queue time for library mount requests is prevented from becoming excessively long relative to the average library mount cycle time. When the difference between the utilization of the most utilized library and the least utilized library exceeds a predetermined value, data is passed from the most utilized library (or libraries) to the least utilized library (or libraries) until the difference is sufficiently reduced. By reducing the difference in utilization between the most and least utilized libraries, mount activity is evenly distributed among the libraries.

28 Claims, 4 Drawing Sheets

UTILIZE

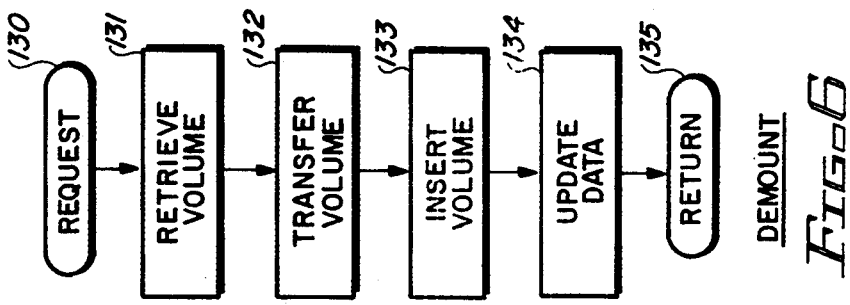
FIG. 6 DEMOUNT
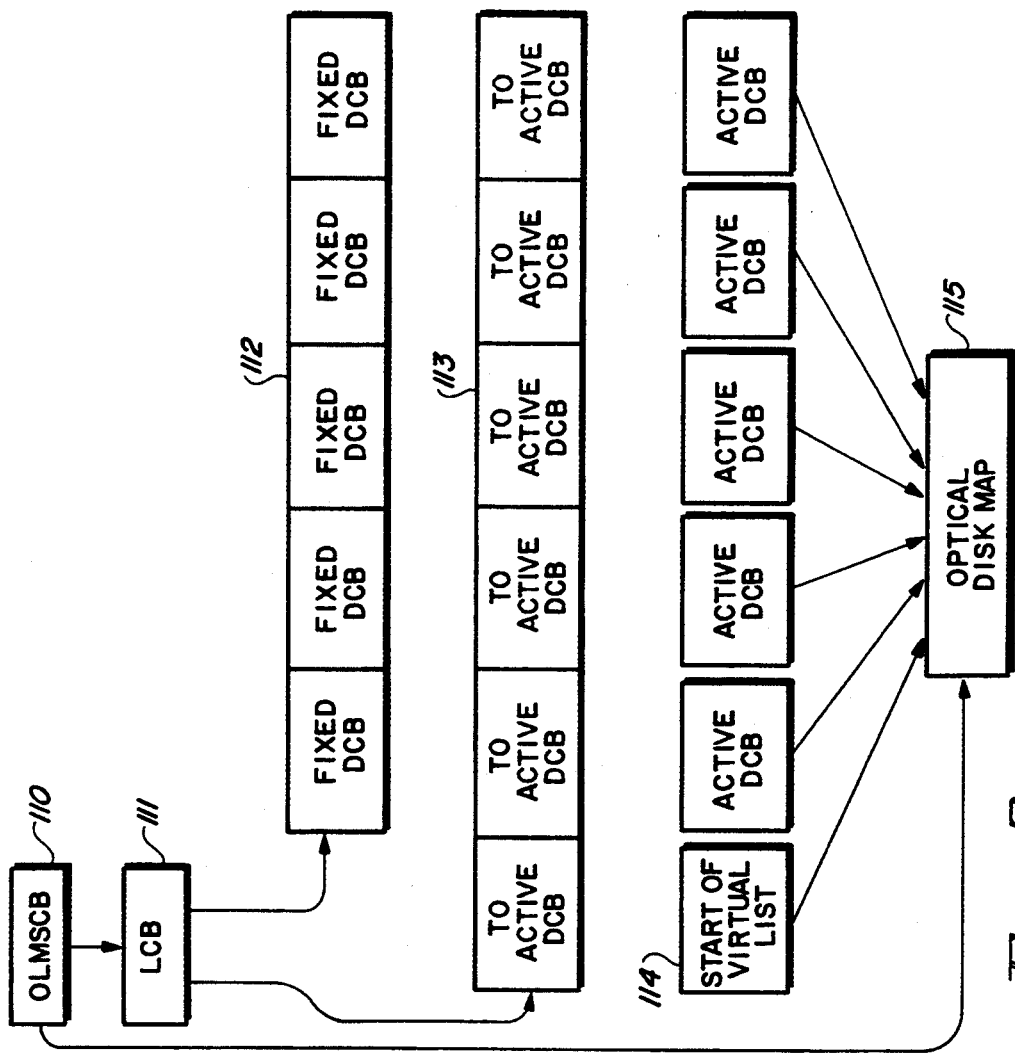
FIG. 3

ENTRY

MOUNT

DESIGNATE

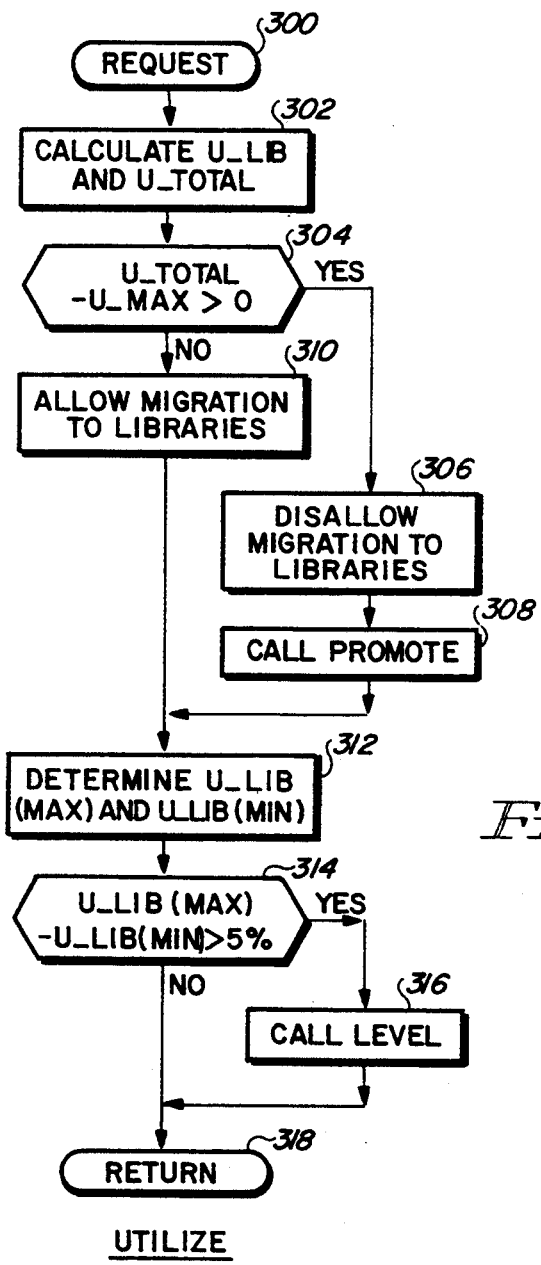
FIG. 8 UTILIZE
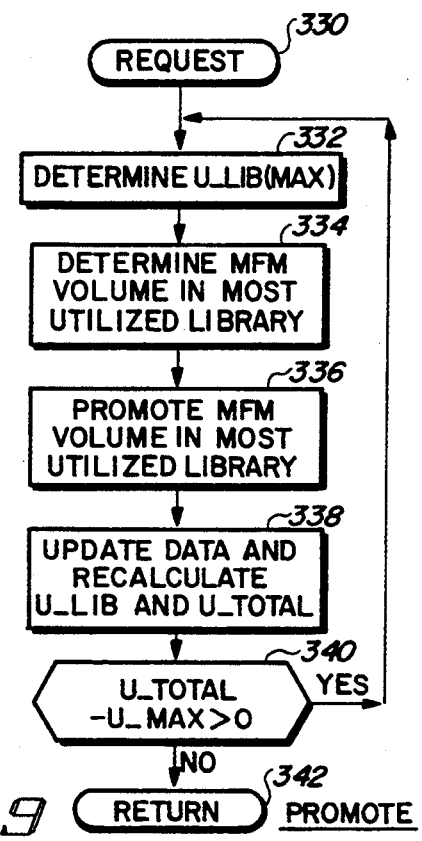
FIG. 9 PROMOTE
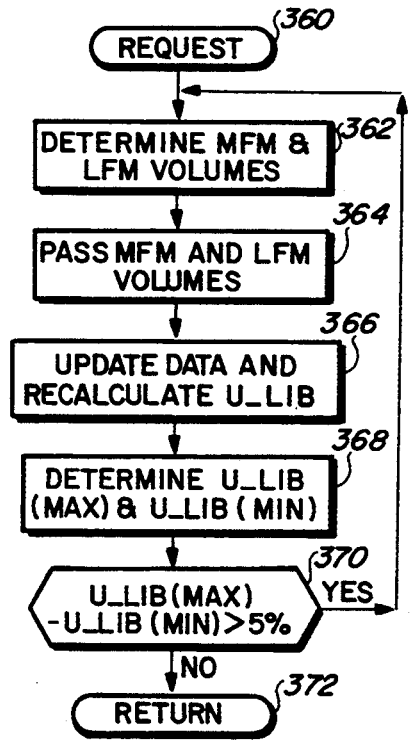
FIG. 10 LEVEL

QUEUE TIME REDUCTION IN A DATA STORAGE HIERARCHY USING VOLUME MOUNT RATE

BACKGROUND OF THE INVENTION

1. Field of the Invention

This invention relates to reducing the queue time for requests for data in a data storage hierarchy. More particularly, the invention relates to monitoring the utilization of a level of the hierarchy and promoting data to a relatively higher level of the hierarchy if monitored level becomes overutilized.

2. Description of the Related Art

Modern computers require a host processor including one or more central processing units and a memory facility. The processor manipulates data stored in the memory according to instructions provided to it. The memory must therefore be capable of storing data required by the processor and transferring that data to the processor at a rate capable of making the overall operation of the computer feasible. The cost and performance of computer memory is thus critical to the commercial success of a computer system.

Because today's computers require large quantities of data storage capacity, computer memory is available in many forms. A fast but expensive form of memory is main memory, typically comprised of microchips. Other available forms of memory are known as peripheral storage devices and include magnetic direct access storage devices (DASD), magnetic tape storage devices, optical recordming devices, and automated storage libraries. Automated storage libraries include a plurality of storage cells for retaining removable data storage media, one or more peripheral storage devices, and machine-executed means ( e.g. a robotic picker) for transferring the data storage media between the storage cells and the peripheral storage devices without manual assistance. These types of memory actually store data on the storage media therein. Each data storage medium may be contained in a cassette or cartridge housing for easier handling.

Each of these other types of memory has a greater storage density and lower cost than main memory. However, these other memory devices do not provide the performance provided by main memory. For example, the time required to properly position the tape or disk beneath the read/write mechanism of the drive cannot compare with the rapid, purely electronic data transfer rate of main memory. The time required to transfer a tape or disk between a storage cell and a drive is skill slower.

It is inefficient to store all of the data in a computer system on but a single type of memory device. Storing all of the data in main memory is too costly and storing all of the data on one of the peripheral storage devices reduces performance. Thus, a typical computer system includes both main memory and one or more types of peripheral storage devices arranged in a data storage hierarchy. The data storage hierarchy arrangement is tailored to the performance and cost requirements of the user. In such a hierarchy, main memory is often referred to as primary data storage, the next level of the hierarchy is often to referred to as secondary data storage, and so on. Generally, the highest level of the hierarchy has the lowest storage capacity, highest performance and highest cost. As one proceeds down through the hierarchy, storage capacity generally increases, performance generally decreases, and cost generally decreases. By transferring data between different levels of the hierarchy as required, the cost of memory is minimized to the extent that the user is willing to trade-off performance. Data is thus stored in main memory only so long as it is expected to be required by the processor. The hierarchy may take many forms, include any number of data storage or memory levels, and may be able to transfer data directly between any two distinct memory levels. The transfer of data may employ I/O channels, controllers, or cache memories as is well known in the art.

In a typical data storage hierarchy, data is stored at one level for a specified period of time, until it becomes relatively inactive, or until tile such level reaches its storage capacity. The data is then migrated to a relatively lower level. Data is not recalled to a higher level unless access to it is specifically required, or is at least probable because of proximity or association with other data for which access is specifically required (as in common caching techniques). When such accesses are complete, the data is again migrated downward through the hierarchy. Eventually, the data reaches the bottom level of the hierarchy, which is generally manually accessible shelf storage of removable data storage media.

As data migrates downward through the hierarchy, the utilization of the lower levels increases, and the queue time for a request to access data in one of such levels grows relative to the actual time to retrieve the data upon removing the request from the queue. It is known that eventually the queue time for a data access request can be longer than the actual data retrieval time. This effect is particularly troublesome in automated storage libraries because the time to retrieve and mount a storage medium is so much greater than the speed with which electronic operations occur in the host processor. The only known techniques for addressing such increasing queue times are simply removing data from the hierarchy altogether, caching, and adding peripheral storage devices to the effected level of the hierarchy. Simply reproving the data resolves the queue time problem at the expense of access to the data. Because caching does not occur unless access to data is requested, it fails to properly anticipate many queue time problems. A heretofore unrecognized problem is the improvement of queue time without the use of the aforementioned techniques.

SUMMARY OF THE INVENTION

In view of the foregoing, it is the principal object of this invention to improve data storage hierarchies, and a method therefor.

Another object of this invention is to prevent the queue time for requests to access data in a data storage hierarchy from becoming excessively long relative to the actual data retrieval time, and a method therefor. Still another object of this invention is to improve data storage hierarchies which include an automated storage library, and a method therefor.

These and other objects of this invention are accomplished by monitoring the utilization of a level of a data storage hierarchy and manipulating the data in such level response thereto. In a data storage hierarchy including an automated storage library, the utilization is a mount rate relative to the maximum possible mount rate. When the combined utilization of the libraries exceeds a predetermined value, data is promoted from the most utilized library (or libraries) to a higher level in the data storage hierarchy until the combined utilization of all of the libraries is sufficiently reduced. By reducing the combined utilization of all of the libraries, the average queue time for library mount requests is prevented from becoming excessively long relative to the average library mount cycle time. When the difference between the utilization of the most utilized library and the least utilized library exceeds a predetermined value, data is passed from the most utilized library (or libraries) to the least utilized library (or libraries) until the difference is sufficiently reduced. By reducing the difference ill utilization between the most and east utilized libraries, mount activity is evenly distributed among the libraries.

In the preferred embodiment, the routines for reducing the utilization of all of the libraries, and the difference in utilization of the most and least utilized libraries, run in the background of normal library operations. A UTILIZE routine calculates the utilization of each library and the combined utilization of all of the libraries and calls a PROMOTE routine and a LEVEL routine in response thereto. The PROMOTE routine is called, as required, to reduce the combined utilization of all of the libraries. The LEVEL routine is called as required, to reduce the difference in utilization between the most utilized and least utilized libraries. The respective reductions are made by manipulating the most frequently mounted volume (or volumes) of data in the most utilized library (or libraries).

The foregoing and other objects, features, and advantages of the invention will be apparent from the following more particular description of the preferred embodiment of the invention, as illustrated in the accompanying drawing.

BRIEF DESCRIPTION OF THE DRAWING

FIG. 3 is a schematic block diagram of the internal data structures created upon initialization of a system controller.

FIG. 6 is a flow chart of the DEMOUNT routine.
FIG. 8 is a flow chart of the UTILIZE routine.
FIG. 9 is a flow chart of the PROMOTE routine.
FIG. 10 is a flow chart of the LEVEL routine.

DESCRIPTION OF THE PREFERRED EMBODIMENT

Figure 1:
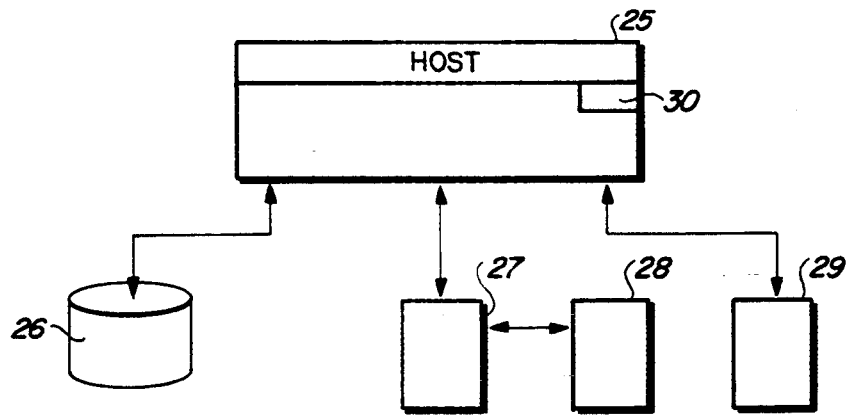
FIG. 1 is a schematic diagram of a data storage hierarchy according to the invention.

Referring now more particularly to the drawing, like numerals denote like features and structural elements in the various figures. The invention will be described as embodied in a data storage hierarchy including an optical disk library. Referring to FIG. 1, the data storage hierarchy will now be described. Host processor 25 includes programming resident therein for storing data in and retrieving data from a data storage hierarchy. The data storage hierarchy includes a first level of peripheral storage, one or more DASD 26, and a second level of peripheral storage, automated storage libraries 27–29. Libraries 27 and 29 are directly coupled to host processor 25, library 28 is coupled to host processor 25 via library 27. In the preferred embodiment, host processor 25 is an IBM 3090 series mainframe processor running the MVS or VM operating system, DASD 26 is an IBM 3390 series direct access storage device, and automated storage libraries 27–29 are IBM 3995 series optical disk libraries.

Figure 2:
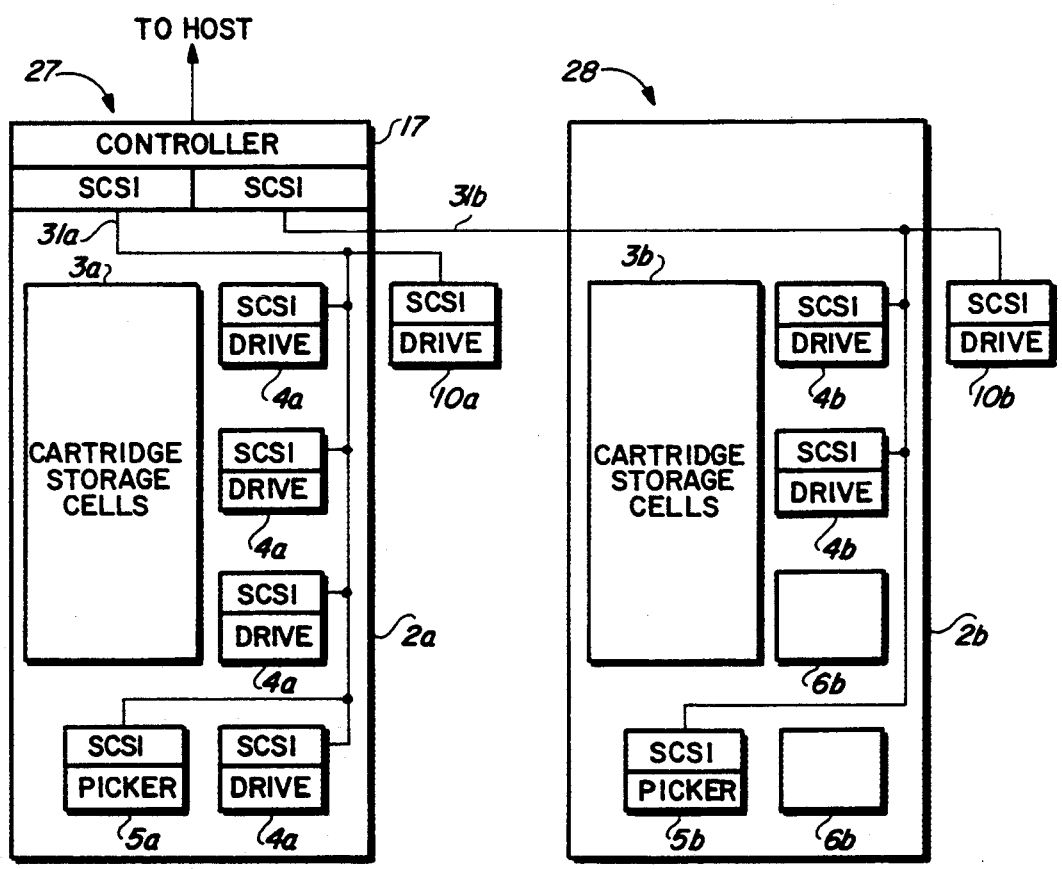
FIG. 2 is a schematic diagram of the optical disk libraries of FIG. 1.

Referring to FIG. 2, the system connections of libraries 2728 will now be described. Library 27 includes a system controller 17 and is directly coupled to the host processor to receive input therefrom and to transmit output thereto. Library 27 is coupled to a channel of a host processor using an IBM channel adapter. Library 28 includes no such system controller and is therefore coupled to system controller 17 of library 27. Any number of libraries similar to library 28 may be attached to system controller 17 of library 27. Library 29 is identical to library 27 except that no other libraries are attached thereto. In the preferred embodiment, libraries 27 and 29 are IBM 3995 Optical Library Dataservers and library 28 is an IBM 3995 Optical Library Expansion Unit.

System controller 17 is coupled to a set of internal optical disk drives 4a and 4b, a set of robotic pickers 5a and 5b, and a set of external optical disk drives 10a and 10b via known single-ended SCSI connections, including a set of SCSI busses 31a and 31b. Because SCSI connections are used, any suitable form factor SCSI-compatible optical disk drive may be located in positions 6b of a library. Library 27 includes drives 4a, picker 5a, drive 10a and SCSI bus 31a. Library 28 includes drives 4b, picker 5b, drive 10b and SCSI bus 31b. Two housings 2a and 2b enclose libraries 27 and 28, respectively. Internal drives 4a and 4b each have an opening for mounting an optical disk therein, the opening exposed to the inside of the respective housing. Thus, picker 5a is capable of transferring optical disks between a set of optical disk storage cells 3a and drives 4a, but cannot directly address storage cells 3b and drives 4b. Similarly, picker 5b is capable of transferring optical disks between a set of optical disk storage cells 3b and drives 4b, but cannot directly address storage cells 3a and drives 4a. External drives 10a and 10b are not addressable by any picker because their respective openings are exposed to the outside of the housings. Drives 10a and 10b permit manual mounting of an optical disk without insertion of the disk into a library.

Each of the libraries also includes an entry/exit slot (not shown) in their respective housing for entering optical disks therein and exiting optical disks therefrom. When an optical disk is manually inserted through the slot it is accepted by the picker and transferred to a storage cell or drive. To remove an optical disk, the picker retrieves it and delivers it to the entry/exit slot for manual removal. To pass an optical disk between different libraries, the disk is ejected from the source library and manually transferred to and inserted in the target library.

In an alternative embodiment, the libraries can be provided with a pass-through port which permits the exchange of optical disks between libraries without manual assistance. A pass-through port links adjacent library housings. In a pass-through port, an opening in each housing permits a storage cell, including the optical disk to be passed, to be repositioned between either of the libraries. In one position the storage cell is addressable exclusively by the picker in one library; in the other position the storage cell is addressable exclusively by the picker in the other library. An example of such a pass-through port is disclosed in, for example, U.S. Pat. No. 4,864,511, hereby incorporated by reference. In another type of pass-through port, the picker from the source library places the optical disk to be passed directly into the target library.

Each library includes 144 storage cells arranged in two 72 storage cell columns. Up to four optical disk drives can be located in each library. The optical disks may include ablative, phase-change, magneto-optic, or any other optical recording layers and may be read-only, write-once, or rewritable, as is known, so long as they are compatible with the optical disk drives. In addition, the optical disks are of a 5 and ¼ inch form factor and may be recorded in a spiral or concentric track pattern. Numerous changes could be made in alternative embodiments. The recording format may be any known in the art.

In the preferred embodiment, system controller 17 is a modified IBM PS/2 personal computer running the OS/2 operating system. System controller 17 includes main memory and one or more storage media, such as those in fixed or floppy disk drives. System controller 17 issues instructions to the drives and pickers as required. The OS/2 operating system mediates the flow of control and directs incoming commands from the host processor into the library subsystem. The libraries can thus be controlled through the use of standard fixed disk operating system commands. The remainder of the programmed control for the libraries is retained in microcode which is uploaded into the main memory of system controller 17 from a storage medium resident therein at initialization.

A set of data for convenient manipulation is often referred to as a "volume". In the preferred embodiment, the data stored on each side of all optical disk is referred to as a "volume" A volume is "mounted" when it is seated in a drive adjacent a read and/or write head (i.e. in an optical drive having a single optical head only capable of accessing data on a single side of an optical disk at any given time, only one volume is "mounted" therein). The pickers may be rotated to bring either side of an optical disk within the grasp of the picker to an upright position. Thus, either volume of an optical disk may be mounted in an optical disk drive. In alternative embodiments the data stored on both sides of an optical disk or on multiple optical disks could be considered to be a volume.

A drive having a volume mounted therein is referred to as "occupied" Once a volume is mounted in a drive, data may be written to or read out from that volume for as long as the system so requires. Data is stored on a volume in the form of one or more files, each file being a logical data set. A file is considered "open" when it is reserved for access by a particular user and the volume upon which it resides is mounted in a drive and ready to be accessed. A drive having a volume mounted therein with an open file is referred to as "active", regardless of whether actual electronic transfer is occurring. A drive is also active if the volume mounted therein is undergoing access under any standard operating system command not requiring that a file be open, such as a directory read. An active volume or optical disk is one mounted in an active drive.

Volumes in a library appear as subdirectories in the root directory of a single peripheral storage device. Labels assigned to each volume represent the subdirectory name. Host processor 25 is able to read the root directory, but cannot store files in the root directory. Any paths accessed on a volume appear as paths under the subdirectory element that represents the volume label. Libraries 27-29 are thus transparent to host processor 25. Upon a request from host processor 25 to access a file, the system controller through which the library is coupled to the host processor locates the file and commands that the volume upon which the file is resident be mounted (if necessary) without the assistance or awareness of the host processor. In addition, upon requests to access a file on a first volume, an already mounted and active second volume may be demounted to accommodate the mounting of the first volume (e.g. if all of the drives are occupied). The second volume is logged in a virtual list, which indicates that it is still active and to be remounted when a drive becomes available. Upon remounting, host processor 25 can complete access to the second volume.

Host processor 25 includes a file 30 in which a variable UMAX is stored. UMAX is the maximum permissible combined utilization of libraries 27-29, and its use will be described later herein. UMAX is entered by an operator and may actually be stored in DASD 26.

System controller 17 includes library configuration, library map, and system performance files. The library configuration, library map, and system performance files are stored on the fixed disk drive of system controller 17 and are maintained by the library operator or maintenance personnel via console and keyboard (not shown). The library configuration file lists various characteristics of the hardware configuration, such as the number of libraries attached thereto, the picker cycle time of each library, the number of drives in each library, whether a drive is internal or external, the number of storage cells in each library, the SCSI addresses of each picker and drive, etc. The library map file lists various characteristics of each optical disk in each attached library, such as the volume label, the address of the home storage cell, free space information, and certain usage statistics such as the number of mounts of each volume thereon, the date and time of last access, the number of accesses to each file, etc. System controller 17 uses the library configuration and library map files to identify the number and arrangement of resources, and makes adjustments as the status of the resources in the attached libraries change. The system performance file lists certain operator specified parameters.

Additional description of the libraries can be found in U.S. Pat. No. 5,121,483, hereby incorporated by reference.

METHOD OF OPERATION

Initialization of each system controller is accomplished using the OS/2 operating system. After self-testing of the hardware to verify correct function, the operating system is loaded and uses the operating system CONFIG.SYS file to set the operating system parameters and load drivers. The operating system then causes the library configuration, library map, and system performance files to be read, and the necessary internal data structures to be created in the main memory of the system controller. After power-on self-test, error detection, and error recovery (if any), each library is receptive to activity from the console or the host processor.

Referring to FIG. 3, the internal data structures include the optical library main system control block (OLMSCB) 110, one or more library control blocks (LCB) 111, fixed drive control blocks (DCB) 112, an active DCB pointer array 113, active DCBs 114, and an optical disk map 115. Pointers are represented by arrows in FIG. 3. OLMSCB 110 includes the number of libraries attached to the system controller, a pointer to optical disk map 115, and a pointer to a LCB 111 for each attached library (for convenience, only the LCB for library 27 is shown in the drawing). Each LCB 111 includes for the respective library the operational status of the picker (on-line, off-line, failed), the number of drives therein, the SCSI address of the picker therein, the number of storage cells therein, the address of each storage cell and the entry/exit slot therein, and a pointer to fixed DCBs 112 for each drive therein. Each LCB 111 also includes a pointer to active DCB pointer array 113, which in turn includes a pointer to an active DCB 114 for each drive therein.

Five fixed DCBs 112 are shown in the drawing, one for each drive in library 27. Each fixed DCB 112 includes certain drive specific information which is "fixed" in that it does not change as optical disks are manipulated about a library. Such information includes for the respective drive the operational status of the drive including a usage attribute indicating whether use of the drive is restricted to certain functions (such as write only). Fixed DCBs 112 are used as permanent records of such information to create active DCBs 114 as optical disks are manipulated about a library, as will be described.

Six active DCB pointers 113 and active DCBs 114 are shown in the drawing, one for each drive in library 27, and one for the virtual list, which is a linked list of the access records for active volumes which are not mounted in a drive. Dynamic DCBs 114 include certain volume specific information about the drives and the virtual accesses. The information is "dynamic" in that it does change (i.e. it is updated) as optical disks are manipulated about a library. Such information includes fox the respective drive or virtual access the appropriate information from fixed DCBs 112 and 14 also the occupancy status of the drive (whether or not there is an optical disk mounted therein), usage statistics such as the last access time and user count for a volume therein or virtual access, an index into the optical disk map for the entry therein which describes the volume mounted in the drive or virtual access, and an index into the file usage database. The index into the optical disk map is used to locate a volume, as required. The user count is the number of current accesses ongoing for a volume, an access being an open file or any standard operating system command not requiring that a file be opened, such as a directory read. Optical disk map 115 includes an entry for each storage cell in each attached library. Entries for storage cells not associated with a disk are blank. Entries for other storage cells list the owner of the assigned disk, and for each volume on the disk, the volume label, the number of volume mounts, the available free space, and other usage statistics. The aforementioned data structures also include other information required for the operation of a library, although not explicitly described for simplicity, as is known in the art.

In operation, host processor 25 may request access to data on DASD 26 or libraries 27-29. During such operation library mount/demount operations will continue on an as needed basis as long as there are existing requests to mount volumes. When a volume is first mounted in a drive, an active DCB 114 pertaining to the access of such volume is created. The active DCB is created by copying the drive specific information relating to the drive in which the volume is mounted from the fixed DCB 112 into a block of memory and adjusting the appropriate pointers. During access to the volume, the volume specific information about such access is updated and stored in the active DCB 114. If the volume is demounted, the volume specific information is deleted from active DCB 114, except for the occupancy status information, to indicate that the respective drive is again empty. When a volume is again mounted in the respective drive, the active DCB 114 is again updated as necessary with the appropriate volume specific information, and so on.

The following description of the aforementioned routines has been simplified wherever possible for convenience to eliminate features already described herein or known in the art. For example, the information in OLMSCB 110, LCB 111, DCBs 112 and 114, and optical disk map 115 are not always referenced as their location and content have already been described. The term "return" is used to refer to an exit from a routine back to the step which called that routine, sometimes including an indication of the results of the routine to the calling step.

After initialization, several routines are used to operate the data storage hierarchy. Some of the routines are run in host processor 25, and some of the routines are run in their respective levels. For example, routines for deciding when data is to be migrated from DASD 26 to libraries 27-29 run in host processor 25 and are stored therein (or in DASD 26). Routines for manipulating libraries 27-29 run in the respective system controller 17, including those for parsing directory path strings, entering optical disks into and exiting optical disks from a library, locating volumes in a library, allocating drives to a volume, flipping optical disks, and mounting and demounting volumes. These routines are stored in the fixed disk drive of the respective system controller 17.

Seven routines are described herein which combine to monitor the utilization of each of the libraries, reduce the utilization of all of the libraries, and reduce the difference in utilization of the most and least utilized libraries. ENTRY, MOUNT, and DEMOUNT routines run in each system controller 17. DESIGNATE, UTILIZE, PROMOTE, and LEVEL routines run as an operating system utilities or an application in host processor 25 and call the ENTRY, MOUNT, and DEMOUNT routines as required. The UTILIZE, PROMOTE, and LEVEL routines run in the background of normal library operations. The UTILIZE routine calculates the utilization of each library and the combined utilization of all of the libraries and calls the PROMOTE routine and/or the LEVEL routine in response thereto. The PROMOTE routine is called, as required, to reduce the combined utilization of all of the libraries. The LEVEL routine is called, as required, to reduce difference in utilization between the most utilized and least utilized libraries. The respective reductions are made by manipulating the most frequently mounted (MFM) volume (or volumes) of data in the most utilized library (or libraries).

Figure 4:
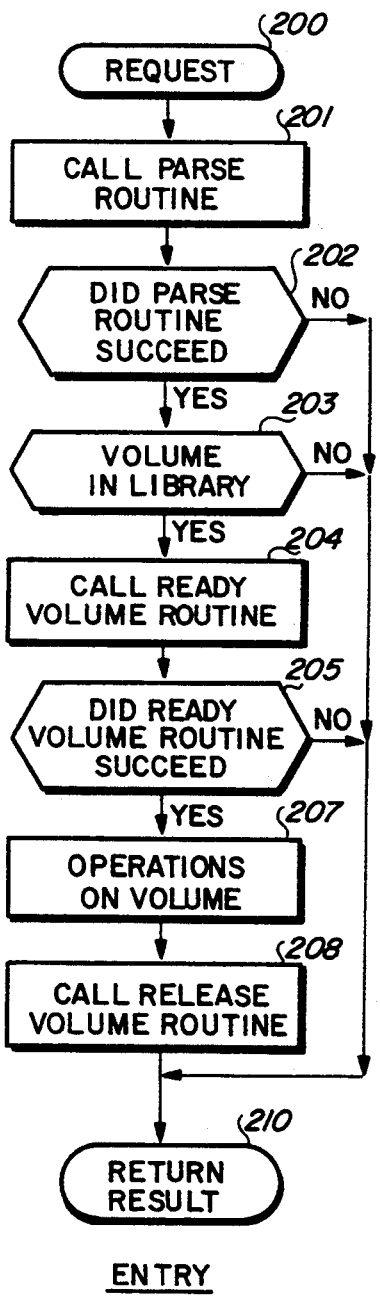
FIG. 4 is a flow chart of the ENTRY routine.

Referring to FIG. 4, the ENTRY routine will now be described. The high level operations of a system controller begin when a host processor requests access to a volume at step 200. At step 201, the PARSE routine (not shown) is called to extract the volume label from the request and locate the designated volume using the optical disk map. 14 Step 202 branches according to the result of the PARSE routine. If the PARSE routine returns an error message (i.e. is not successfully completed) such error message is returned at step 210. If the PARSE routine is successful, step 203 branches according to the location of the designated volume. If the designated volume is not located in one of the attached libraries, such volume cannot be accessed therein. The ENTRY routine therefore skips to step 210 and an error message is returned. If the designated volume is located in an attached library, the READY VOLUME routine (not shown) is called at step 204. The READY VOLUME routine is used to determine several required operations. Some of these operations require calling other routines, such as the MOUNT and DEMOUNT routines, depending upon the location of the designated volume. Upon completion of the READY VOLUME routine, step 205 branches according to the result of the READY VOLUME routine. If the READY VOLUME routine returns an error message (i.e. is not successfully completed) such error message is returned at step 210. If the READY VOLUME routine is successful, operations on the designated volume according to the request occur at step 207. When such operations complete, the RELEASE VOLUME routine (not shown) is called at step 208. Again, the RELEASE VOLUME routine is used to determine several required operations and may call other routines, including the DEMOUNT routine. When the RELEASE VOLUME routine completes, the restilt is returned at step 210. Except as further provided herein, details of the routines called by the ENTRY routine are not relevant to the subject invention.

Figure 5:
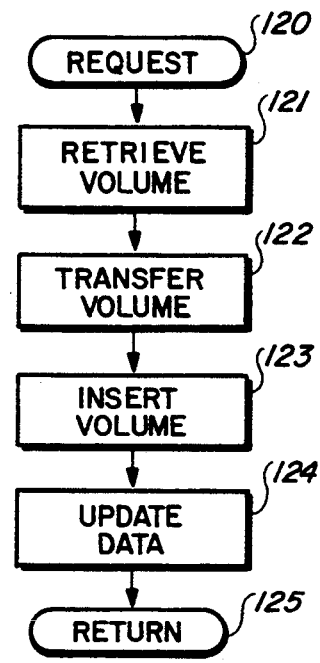
FIG. 5 is a flow chart of the MOUNT routine.

Referring to FIG. 5, the MOUNT routine begins when it is called at step 120. At step 121, the designated volume is retrieved from its current location by picker 5. The designated volume is then transferred to the allocated drive 4 at step 122 and inserted therein at step 123. Step 123 also includes spinning up the allocated drive to operating speed. At step 124, the internal data structures are tipdated as required, including incrementing the number of mounts for the volume in optical disk map 115. The MOUNT routine returns at step 125.

Referring to FIG. 6, the DEMOUNT routine begins when it is called at step 130. At step 131, the designated volume is spun down and retrieved by picker 5. The designated volume is then transferred to its home storage cell 3 at step 132 and inserted therein at step 133. At step 134, the internal data structures are updated as required. The DEMOUNT routine returns at step 135.

Figure 7:
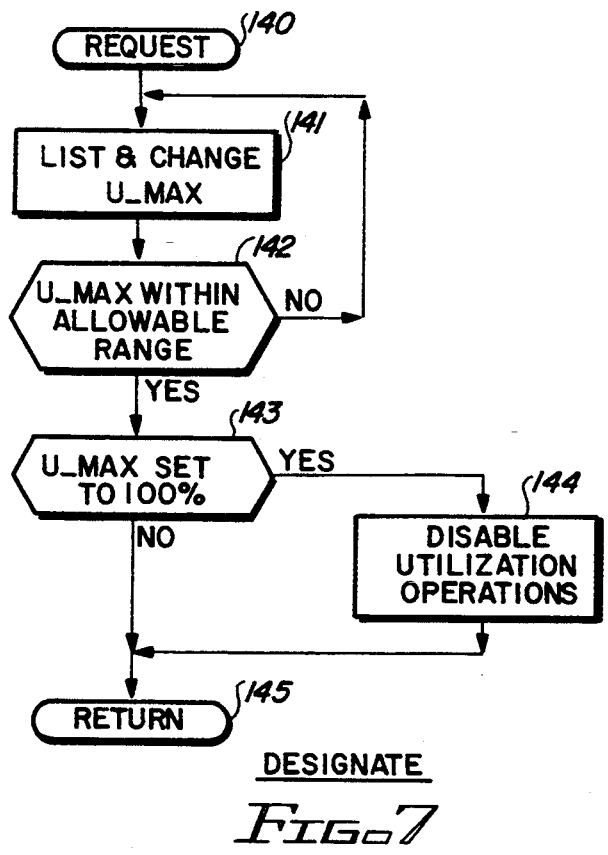
FIG. 7 is a flow chart of the DESIGNATE routine.

Host processor 25 is similarly initialized, as is known, to prepare it to manipulate the data storage hierarchy. In addition, the host processor is initialized with UMAX. At any time during the operation of the data storage hierarchy, an operator can initiate the DESIGNATE routine to alter UMAX. Referring to FIG. 7, the DESIGNATE routine will now be described beginning with its request at step 140. At step 141, the operator is presented with a list of certain current operator specified parameters, including UMAX, and enters any desired changes thereto. Step 142 checks to determine whether the entered value falls within the allowable range of 0% to 100% If the value is outside of the allowable range, the DESIGNATE routine loops back to step 141 to permit the operator to enter another value. If the value entered is within the allowable range, step 143 branches according to whether the operator entered 100% for UMAX. If so, all utilization operations, including the UTILIZATION routine, are disabled at step 144. If no value is entered, UMAX defaults to 50%. If not, the DESIGNATE routine returns at step 145.

The UTILIZE, PROMOTE, and LEVEL routines are used to ensure that the utilization of each library and the combined utilization of all of the libraries are maintained within an acceptable range. The respective utilization adjustments are made by manipulating the most frequently mounted volume (or volumes) of data in the most utilized library (or libraries), as will be described. The number of mounts of each volume are available from the optical disk map in the respective system controller. The average picker cycle time, assuming random operations on a library operating at full capacity, is available from the library configuration file of each system controller. The picker cycle time is the time to mount and demount an optical disk, and can be used to calculate the maximum possible mount rate in a library.

The utilization of each library, ULIB, can be calculated by summing the total number of mounts of the optical disks therein over a period of time, dividing the number of such mounts by the period of time to obtain a mount rate, dividing such mount rate by the maximum mount rate possible in the respective library, and converting to a percentage.

Thus, the utilization is not simply a measurement of how busy a library is, but how busy a library is relative to its potential. The combined utilization of all of the libraries, UTOTAL, can thus be calculated by summing the total number of mounts of the optical disks in all of the libraries over a period of time, dividing the number of such mounts by the period of time to obtain a mount rate, dividing such mount rate by the maximum total mount rate possible in all of the libraries, and converting to a percentage. The maximum permissible combined utilization of all of the libraries, UMAX, is specified by an operator during the DESIGNATE routine.

Referring to FIG. 8, the UTILIZE routine will now be described. The UTILIZE routine begins at step 300, and at step 302 ULIB (for each library) and UTOTAL are calculated. At step 304, the UTILIZE routine branches depending upon the difference between UTOTAL and UMAX. If the difference is less than or equal to zero (i.e. UTOTAL is less than or equal to UMAX), the routine skips to step 310 because the libraries are not considered to be overutilized. The migration of data is permitted at step 310 before proceeding to step 312. If the difference is greater than zero (i.e. UTOTAL is greater than UMAX), the libraries are considered to be overutilized as a whole and data must be promoted to DASD. The migration of data to the libraries is halted at step 306 and the PROMOTE routine is called at step 308. After the PROMOTE routine returns, the UTILIZE routine continues at step 312. At step 312, the libraries having the highest value of ULIB, ULIB(MAX), and the lowest value of ULIB, ULIB(MIN), are identified (i.e. the most utilized and least utilized libraries relative to their respective capability, hereafter referred to simply as the "most utilized" and "least utilized" libraries). At step 314, the UTILIZE routine branches depending upon the difference between ULIB(MAX) and ULIB(MIN). If the difference is less than or equal to 5%, the mount activity is considered to be evenly distributed among the libraries and the UTILIZE routine returns at step 318. If the difference is greater than 5%, the mount activity is not considered to be evenly distributed among the libraries and the LEVEL routine is called at step 316. After the LEVEL routine returns, the UTILIZE routine returns at step 318.

Referring to FIG. 9, the PROMOTE routine will now be described. The PROMOTE routine begins at step 330 and at step 332 the library having the highest value of ULIB, ULIB(MAX), is identified. At step 334, the MFM volume of data in the most utilized library is identified. At step 336, the MFM volume of data in the most utilized library is promoted to DASD. Promotion requires that the MFM volume be mounted. Thus, the MOUNT routine is called as required. At step 338, the mount activity data is updated by deleting the data relating to the MFM volume. In addition, ULIB and UTOTAL are recalculated. Note that ULIB is only recalculated for the library from which the MFM volume was promoted. This library was the most utilized library, but may not be once the MFM volume is eliminated therefrom. ULIB is not recalculated for the other libraries because the promotion of the MFM volume does not effect their respective utilizations.

At step 340, the PROMOTE routine branches depending upon the difference between UTOTAL and UMAX. Step 340 is identical to step 304. If the difference is less than or equal to zero, the libraries are no longer considered to be overutilized and the routine returns at step 342. If the difference is greater than zero, the libraries are still considered to be overutilized as a whole and data must again be promoted to DASD. The routine therefore loops back to step 332. The loops continue until the overutilization of the libraries is sufficiently reduced, as determined at step 340. Note that a different one of the libraries may be identified as the most utilized library at each loop through the PROMOTE routine.

Referring to FIG. 10, the LEVEL routine will now be described. The LEVEL routine begins at step 360 and at step 362 the MFM volume in the most utilized library and the least frequently mounted (LFM) volume in the least utilized library are identified. At step 364, the MFM volume of data in the most utilized library is passed to the least utilized library and the LFM volume of data in the least utilized library is passed to the most utilized library. Passing is accomplished physically or electronically. Physical passing occurs by passing the actual optical disk(s) containing the MFM and LFM volumes, either manually or via a pass-through port between the respective libraries. Note that physical passing might also pass other volumes on the same optical disk(s). Electronic passing occurs by uploading the data in the MFM and LFM volumes to the host processor and then downloading them to the least utilized library, including calling the MOUNT routine as required. At step 366, the mount activity data is updated to reflect that the MFM and LFM volumes (and any associated volumes on the same optical disk(s), if applicable) have been passed from one library to another. In addition, ULIB is recalculated for the effected libraries.

At step 368, the libraries having the highest value of ULIB, ULIB(MAX), and the lowest value of ULIB, ULIB(MIN), are again identified. Step 368 is identical to step 312. At step 370, the LEVEL routine branches depending upon the difference between ULIB(MAX) and ULIB(MIN). Step 370 is identical to step 314. If the difference is less than or equal to 5%, the mount activity is considered to be evenly distributed among the libraries and the LEVEL routine returns at step 372. If the difference is greater than 5%, the mount activity is not considered to be evenly distributed among the libraries and the LEVEL routine loops back to step 362. The loops continue until the mount activity is evenly distributed among the libraries, as determined at step 370. Note that different ones of the libraries may be identified as the most utilized and least libraries at each loop through the LEVEL routine.

Variations to the aforementioned routines could be made in alternative embodiments. For example, the UTILIZE, PROMOTE, and LEVEL routines could run in each system controller rather than in the host processor. In such an arrangement, the three routines in each system controller would only monitor and manipulate the libraries coupled to the respective system controller. A separate UMAX would be specified for each system controller, and an interrupt would be sent to the host processor to initiate the promotion of a MFM volume of data to DASD. In other alternative embodiments, the PROMOTE routine could only be exited when UTOTAL is reduced a predetermined amount below UMAX which is specified by an operator in the DESIGNATE routine. Similarly, the LEVEL routine could only be called when ULIB(MAX) exceeds ULIB(MIN) by a predetermined amount and could only be exited when ULIB(MAX) is within a predetermined amount of ULIB(MIN), both of the predetermined amounts being specified by an operator in the DESIGNATE routine. Also, in a data storage hierarchy having a single library, steps 312–316 and the LEVEL routine would be eliminated.

In another alternative embodiment, the type of libraries used could be altered. For example, the libraries could include a carousel of storage cells which can be rotated to position certain storage cells adjacent a picker for retrieval of the volumes therein. In addition, such a carousel can be positioned intermediate pickers in different libraries and thus shared therebetween. An example of such a carousel is disclosed in U.S. Pat. No. 5,108,246, hereby incorporated by reference. Instead of passing the MFM volume of data between libraries, the MFM volume (or volumes) could simply be moved to a different storage cell on the carousel, and/or the carousel could be repositioned, to make the MFM volume more or less accessible to the picker of a particular library. Finally, the carousel could be returned to a default position after each access, and the storage cells on each half of the carousel could be considered part of the library on the side of the respective half. The LEVEL routine could then pass cartridges from one side of the carousel to the other to reduce the difference in utilization between a more utilized library and a less utilized library.

Host processor 25 could also be an IBM AS/400 midrange computer running the OS/400 operating system, or a network 14 of processors, such as IBM PS/2 personal computers running the OS/2 or DOS operating system or IBM RISC System 6000 workstations running the AIX operating system, and arranged in a local area network (LAN). The connections to all of the host processors are known in the art.

While the invention has been described with respect to a preferred embodiment thereof, it will be understood by those skilled in the art that various changes in detail may be made therein without departing from the spirit, scope, and teaching of the invention. For example, the number of drives and storage cells within the optical disk libraries could be varied and the system controller could be located external to the housing. While the invention has been disclosed ill the context of a data storage hierarchy including one or more optical disk libraries, similar consideration could make it equally applicable to any data storage hierarchy, including those with a type of storage device other than DASD for the first level of the hierarchy, and those with freestanding (i.e. non-library) peripheral storage devices for the second level of the hierarchy. When non-library devices are used for the second level, the utilization would be a measure of the rate at which removable storage media (e.g. disks or tape) are manually mounted, or the rate at which head seek operations occur upon non-removable storage media. The routines described herein would be changed as required by the associated hardware. Accordingly, the invention disclosed herein is to be limited only as specified in the following claims.

What is claimed is:

1. A method for improving the efficiency of a data storage hierarchy, the data storage hierarchy including a first level of data storage and a second level of data storage each coupled to a host processor, the second level having a relatively greater capacity for storing data than the first level and including an automated storage library, the library including a peripheral storage device, a plurality of storage cells, and a machine-executed means for mounting, in the peripheral storage device, any of a plurality of volumes of data on a plurality of storage media in the storage cells, the method comprising the machine-executed steps of:

monitoring a utilization of the library wherein the utilization is a volume mount rate of the means for mounting;

comparing the utilization of the library to a first predetermined value; and, in response thereto, if the utilization of the library exceeds the first predetermined value, regardless of the rate of promotion of data from the library to the first level, the host processor promoting data from the library to the first level.

2. The method of claim 1 wherein, if the utilization of the library exceeds the first predetermined value, the host processor promotes data from the library to the first level until the utilization of the library is reduced to a second predetermined value.

3. The method of claim 1 wherein, if the utilization of the library exceeds the first predetermined value, the host processor promotes volumes of data from the library to the first level until the utilization of the library is reduced to a second predetermined value.

4. The method of claim 1 wherein, if the utilization of the library exceeds the first predetermined value, the host processor promotes, from the library to the first level, the volumes of data which have been most frequently mounted, until the utilization of the library is reduced to a second predetermined value.

5. A method for improving the efficiency of a data storage hierarchy, the data storage hierarchy including a first level of data storage and a second level of data storage each coupled to a host processor, the second level having a relatively greater capacity for storing data than the first level and including a plurality of automated storage libraries, each of the libraries including a peripheral storage device, a plurality of storage cells, and a machine-executed means for mounting, in the peripheral storage device, any of a plurality of volumes of data on a plurality of storage media in the storage cells, the method comprising the machine-executed steps of:

monitoring a combined utilization of all of the libraries wherein the combined utilization is a combined volume mount rate of the means for mounting in all of the libraries;

comparing the combined utilization of all of the libraries to a first predetermined value; and, in response thereto, if the combined utilization of all of the libraries exceeds the first predetermined value, regardless of the rate of promotion of data from the libraries to the first level the host processor promoting data from the libraries to the first level.

6. The method of claim 5 wherein, if the combined utilization of all of the libraries exceeds the first predetermined value, the host processor promotes data from the libraries to the first level until the combined utilization of all of the libraries is reduced to a second predetermined value.

7. The method of claim 5 wherein, if the combined utilization of all of the libraries exceeds the first predetermined value, the host processor promotes a volume of data from the libraries to the first level.

8. The method of claim 5 wherein the combined utilization of all of the libraries is a combined volume mount rate of the means for mounting in all of the libraries and, if the combined utilization of all of the libraries exceeds the first predetermined value, the host processor promotes volumes of data from the libraries to the first level until the combined utilization of all of the libraries is reduced to a second predetermined value.

9. The method of claim 5 further comprising:

monitoring the utilization of each of the libraries, wherein the utilization of each of the libraries is a volume mount rate of the means for mounting in each of the libraries, respectively;

if the combined utilization of all of the libraries exceeds the first predetermined value, determining the one of the libraries having the greatest utilization; and, in response thereto, the host processor promoting a volume from the one of the libraries having the greatest utilization to the first level.

10. The method of claim 9 wherein the host processor promotes to the first level, from the one of the libraries having the greatest utilization, the volume of data therein which has been most frequently mounted regardless of the frequency of mounting of volumes in other of the libraries.

11. The method of claim 9 further comprising:

determining the one of the libraries having the greatest utilization and the one of the libraries having the least utilization; and, in response thereto, passing to the one of the libraries having the least utilization, from the one of the libraries having the greatest utilization, the volume of data therein which has been most frequently mounted.

12. A data storage hierarchy for storing and retrieving data for a host processor, the data storage hierarchy comprising:

a first level of data storage coupled to the host processor;

a second level of data storage coupled to the host processor, the second level having a relatively greater capacity for storing data than the first level and including an automated storage library, the automated storage library including:

a position for a peripheral storage device to be located therein;

a plurality of storage cells; and first machine-executed means for mounting, in a peripheral storage device at the position, any of a plurality of volumes of data on a plurality of storage media in the storage cells; and second machine-executed means for monitoring a utilization of the library wherein the utilization is a volume mount rate of the means for mounting, comparing the utilization of the library to a first predetermined value and, in response thereto, if the utilization of the library exceeds the first predetermined value, regardless of the rate of promotion of data from the library to the first level, promoting data from the library to the first level.

13. The data storage hierarchy of claim 12 wherein, if the utilization of the library exceeds the first predetermined value, the second machine-executed means promotes data from the library to the first level until the utilization of the library is reduced to a second predetermined value.

14. The data storage hierarchy of claim 12 wherein, if the utilization of the library exceeds the first predetermined value, the second machine-executed means promotes volumes of data from the library to the first level until the utilization of the library is reduced to a second predetermined value.

15. The data storage hierarchy of claim 12 wherein, if the utilization of the library exceeds the first predetermined value, the second machine-executed means promotes, from the library to the first level, the volumes of data which have been most frequently mounted, until the utilization of the library is reduced to a second predetermined value.

16. A data storage hierarchy for storing and retrieving data for a host processor, the data storage hierarchy comprising:

a first level of data storage coupled to the host processor;

a second level of data storage coupled to the host processor, the second level having a relatively greater capacity for storing data than the first level and including an automated storage library, the automated storage library including:

a peripheral storage device;

a plurality of storage cells; and first machine-executed means for mounting, in the peripheral storage device, any of a plurality of volumes of data on a plurality of storage media in the storage cells; and second machine-executed means for monitoring a utilization of the library wherein the utilization is a volume mount rate of the means for mounting, comparing the utilization of the library to a first predetermined value and, in response thereto, if the utilization of the library exceeds the first predetermined value, regardless of the rate of promotion of data from the library to the first level, promoting data from the library to the first level.

17. The data storage hierarchy of claim 16 wherein, if the utilization of the library exceeds the first predetermined value, the second machine-executed means promotes data from the library to the first level until the utilization of the library is reduced to a second predetermined value.

18. The data storage hierarchy of claim 16 wherein, if the utilization of the library exceeds the first predetermined value, the second machine-executed means promotes volumes of data from the library to the first level until the utilization of the library is reduced to a second predetermined value.

19. The data storage hierarchy of claim 16 wherein, if the utilization of the library exceeds the first predetermined value, the second machine-executed means promotes, from the library to the first level, the volumes of data which have been most frequently mounted, until the utilization of the library is reduced to a second predetermined value.

20. A data storage hierarchy for storing and retrieving data for a host processor, the data storage hierarchy comprising:

a first level of data storage coupled to the host processor;

a second level of data storage coupled to the host processor, the second level having a relatively greater capacity for storing data than the first level and including a plurality of automated storage libraries, the automated storage libraries each including:

a peripheral storage device;

a plurality of storage cells; and first machine-executed means for mounting, in the peripheral storage device, any of a plurality of volumes of data on a plurality of storage media in the storage cells; and second machine-executed means for monitoring a combined utilization of all of the libraries wherein the combined utilization is a combined volume mount rate of the means for mounting in all of the libraries, comparing the combined utilization of all of the libraries to a first predetermined value and, in response thereto, if the combined utilization of all of the libraries exceeds the first predetermined value, regardless of the rate of promotion of data from the library to the first level, promoting data from the libraries to the first level.

21. The data storage hierarchy of claim 20 wherein, if the combined utilization of all the libraries exceeds the first predetermined value, the second machine-executed means promotes data from the libraries to the first level until the combined utilization of all of the libraries is reduced to a second predetermined value.

22. The data storage hierarchy of claim 20 wherein, if the confined utilization of all of the libraries exceeds the first predetermined value, the second machine-executed means promotes a volume of data from the libraries to the first level.

23. The data storage hierarchy of claim 20 wherein, if the combined utilization of all of the libraries exceeds the first predetermined value, the second machine-executed means promotes volumes of data from the libraries to the first level until the combined utilization of all of the libraries is reduced to a second predetermined value.

24. The data storage hierarchy of claim 20 wherein the second machine-executed means monitors the utilization of each of the libraries, the utilization of each of the libraries is a volume mount rate of the means for mounting in each of the libraries, respectively, and the second machine-executed means determines the one of the libraries having the greatest utilization and, in response thereto, promotes a volume from the one of the libraries having the greatest utilization to the first level.

25. The data storage hierarchy of claim 24 wherein the second machine-executed means promotes to the first level, from the one of the libraries having the greatest utilization, the volume of data therein which has been most frequently mounted regardless of the frequency of mounting of volumes in other of the libraries.

26. The data storage hierarchy of claim 24 wherein the second machine-executed means determines the one of the libraries having the greatest utilization and the one of the libraries having the least utilization and, in response thereto, commands the passing to the one of the libraries having the least utilization, from the one of the libraries having the greatest utilization, the volume of data therein which has been most frequently mounted.

27. A method for improving the efficiency of a data storage hierarchy, the data storage hierarchy including a first level of data storage and a second level of data storage each coupled to a host processor, the second level having a relatively greater capacity for storing data than the first level and including a plurality of automated storage libraries, each of the libraries including a peripheral storage device, a plurality of storage cells, and a machine-executed means for mounting, in the peripheral storage device, any of a plurality of volumes of data on a plurality of storage media in the storage cells, the method comprising the machine-executed steps of:

monitoring the utilization of each of the libraries, wherein the utilization of each of the libraries is a volume mount rate of the means for mounting in each of the libraries, respectively;

determining the one of the libraries having the greatest utilization and the one of the libraries having the least utilization; and, in response thereto, passing to the one of the libraries having the least utilization, from the one of the libraries having the greatest utilization, the volume of data therein which has been most frequently mounted.

28. A data storage hierarchy for storing and retrieving data for a host processor, the data storage hierarchy comprising:

a first level of data storage coupled to the host processor;

a second level of data storage coupled to the host processor, the second level having a relatively greater capacity for storing data than the first level and including a plurality of automated storage libraries, the automated storage libraries each including:
   a peripheral storage device;
   a plurality of storage cells; and first machine-executed means for mounting, in the peripheral storage device, of a plurality of volumes of data on a plurality of storage media in the storage cells; and second machine-executed means for monitoring the utilization of each of the libraries, wherein the utilization of each of the libraries is a volume mount rate of the means for mounting in each of the libraries, respectively, for determining the one of the libraries having the greatest utilization and the one of the libraries having the least utilization and, in response thereto, for commanding the passing to the one of the libraries having the least utilization, from the one of the libraries having the greatest utilization, the volume of data therein which has been most frequently mounted.

* * * * *

UNITED STATES PATENT AND TRADEMARK OFFICE
CERTIFICATE OF CORRECTION

PATENT NO. : 5,423,018   Page 1 of 3
DATED      : Jun. 6, 1995
INVENTOR(S): Chi H. Dang; Michael T. Solan; Daniel J. Winarski It is certified that error appears in the above-indentified patent and that said Letters Patent is hereby corrected as shown below:

On title page, item [54] and Col. 1, line 3,
   At Title delete "-" after -- Data --.

At column 1, line 31, "recordming" should be -- recording --.

At column 1, line 51, "skill" should be -- still --.

At column 2, line 14, "tile" should be -- the --.

At column 3, line 12, "ill" should be -- in --.

At column 3, line 13, "east" should be -- least --.

At column 4, line 6, "2728" should be -- 27-28 --.

At column 6, line 17, "UMAX" should be -- U_MAX -- in both places.

At column 6, line 19, "UMAX" should be --U_MAX --.

At column 7, line 35, "fox" should be -- for --.

At column 7, line 37, delete "14".

At column 8, line 66, delete "14".

At column 9, line 38, "tipdated" should be -- updated --.

At column 9, line 51, line 53, line 57, line 65 and line 67, "UMAX" should be -- U_MAX --.

At column 10, line 16, "ULIB" should be -- U_LIB --.

At column 10, line 26, line 39, and line 45, "UTOTAL" should be -- U_TOTAL --.

At column 10, line 33, line 40 and line 46, "UMAX" should be -- U_MAX --.

UNITED STATES PATENT AND TRADEMARK OFFICE
CERTIFICATE OF CORRECTION

PATENT NO. : 5,423,018
DATED : Jun. 6, 1995
INVENTOR(S) : Chi H. Dang; Michael T. Solan; Daniel J. Winarski It is certified that error appears in the above-indentified patent and that said Letters Patent is hereby corrected as shown below:

At column 10, line 37, "ULIB" should be -- U_LIB -- and "UTOTAL" should be -- U_TOTAL --.

At column 10, line 41, "UTOTAL" should be -- U_TOTAL -- and "UMAX" should be -- U_MAX --.

At column 10, line 52 and line 53, "ULIB, ULIB(-" should be -- U_LIB, U_LIB( --.

At column 10, line 59, "ULIB(MAX) and ULIB(MIN)" should be -- U_LIB(MAX) and U_LIB(MIN) --.

At column 11, line 4, "ULIB, ULIB" should be -- U_LIB, U_LIB --.

At column 11, line 11, line 16 and line 55, "ULIB" should be -- U_LIB --.

At column 11, line 12 "UTOTAL" should be -- U_TOTAL -- and "ULIB" should be -- U_LIB --.

At column 11, line 20, "UTOTAL" should be -- U_TOTAL --.

At column 11, line 21, "UMAX" should be -- U_MAX --.

At column 11, line 57, "ULIB" in all three places in line should be -- U_LIB --.

At column 11, line 58, line 60 and line 61, "ULIB" should be -- U_LIB --.

At column 12, line 12 and line 18, "UMAX" should be -- U_MAX --.

At column 12, line 17, "UTOTAL" should be -- U_TOTAL --.

At column 12, line 20, line 21, line 22 and line 23, "ULIB" should be -- U_LIB --.

UNITED STATES PATENT AND TRADEMARK OFFICE
CERTIFICATE OF CORRECTION

PATENT NO. : 5,423,018
DATED : Jun. 6, 1995
INVENTOR(S) : Chi H. Dang; Michael T. Solan; Daniel J. Winarski It is certified that error appears in the above-indentified patent and that said Letters Patent is hereby corrected as shown below:

At column 12, line 52, delete "14".

At column 12, line 66, "ill" should be -- in --.

At column 14, line 9, insert -- , -- between "level" and "the".

At column 18, line 17, insert -- any -- between "device,' and "of".

Signed and Sealed this

Nineteenth Day of September, 1995

Attest:

BRUCE LEHMAN

*Attesting Officer*   *Commissioner of Patents and Trademarks*